(12) United States Patent
Arai

(10) Patent No.: US 9,451,432 B2
(45) Date of Patent: Sep. 20, 2016

(54) INPUT/OUTPUT SYSTEM, INPUT/OUTPUT METHOD, AND MOBILE TERMINAL

(71) Applicant: Masaki Arai, Tokyo (JP)

(72) Inventor: Masaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 14/204,006

(22) Filed: Mar. 11, 2014

(65) Prior Publication Data

US 2014/0273864 A1 Sep. 18, 2014

(30) Foreign Application Priority Data

Mar. 14, 2013 (JP) .................................. 2013-052476
Feb. 27, 2014 (JP) .................................. 2014-037007

(51) Int. Cl.
*H04W 4/18* (2009.01)
*H04N 1/00* (2006.01)
*H04L 29/08* (2006.01)

(52) U.S. Cl.
CPC .............. *H04W 4/18* (2013.01); *H04L 67/125* (2013.01); *H04N 1/00127* (2013.01)

(58) Field of Classification Search
CPC .. H04L 67/125; H04N 1/00127; H04W 4/18
USPC ............................................... 455/41.2, 66.1
See application file for complete search history.

(56) References Cited

U.S. PATENT DOCUMENTS

| | | | |
|---|---|---|---|
| 2003/0058343 A1* | 3/2003 | Katayama | .................. 348/207.1 |
| 2005/0235077 A1 | 10/2005 | Kubota | |
| 2006/0007470 A1* | 1/2006 | Takamidoh | .................. 358/1.14 |
| 2010/0070873 A1* | 3/2010 | Tokashiki | ...................... 715/745 |
| 2011/0292445 A1* | 12/2011 | Kato | ............................. 358/1.15 |
| 2013/0137374 A1* | 5/2013 | Stephens et al. | ............. 455/41.2 |
| 2013/0250358 A1 | 9/2013 | Suzuki | |
| 2014/0016161 A1 | 1/2014 | Yamada | |
| 2014/0016816 A1 | 1/2014 | Yamada | |
| 2014/0019499 A1 | 1/2014 | Arai | |
| 2014/0019859 A1 | 1/2014 | Hashimoto | |

FOREIGN PATENT DOCUMENTS

| | | |
|---|---|---|
| JP | 2005-292903 | 10/2005 |
| JP | 2014-016896 | 1/2014 |
| JP | 2014-016897 | 1/2014 |

(Continued)

*Primary Examiner* — Ping Hsieh
*Assistant Examiner* — Xin Jia
(74) *Attorney, Agent, or Firm* — IPUSA, PLLC

(57) ABSTRACT

An input/output system interconnects a mobile terminal, a cooperative processing apparatus, and a plurality of electronic devices, and is configured to implement a cooperative process of prompting an electronic device corresponding to an input apparatus to input electronic data and prompting an electronic device corresponding to an output apparatus to output the input electronic data. The input/output system includes an acquisition unit that acquires input/output apparatus information from the electronic device corresponding to the input/output apparatus, an input control unit that controls the electronic device specified by the input apparatus information to input electronic data, and an output control unit that controls the electronic device specified by the output apparatus information to output the input electronic data in an output format compatible with the electronic device specified by the output apparatus information if the electronic device is capable of directly outputting the input electronic data from the mobile terminal.

10 Claims, 15 Drawing Sheets

(56) References Cited

FOREIGN PATENT DOCUMENTS

| JP | 2014-016898 | 1/2014 |
| JP | 2014-016899 | 1/2014 |
| JP | 2014-032661 | 2/2014 |
| JP | 2014-032662 | 2/2014 |
| JP | 2014-033436 | 2/2014 |
| JP | 2014-033437 | 2/2014 |
| WO | WO 2014/010711 A1 | 1/2014 |

* cited by examiner

FIG.9

| Return | Folder Selection Data | |
|---|---|---|
| | test xxxx/xx/xx xx:xx:xx | ∧ |
| | New folder xxxx/xx/xx xx:xx:xx | ∧ |
| | Material xxxx/xx/xx xx:xx:xx | ∧ |
| | Number of folders: 3 | Complete |
| Cancel | | |

FIG.10

| Read Setting | | Complete |
|---|---|---|
| Document type | Text/photo (full color) | > |
| Resolution | 300dpi | > |
| Sides | Single-sided | > |
| Document orientation | Auto | > |
| Blank page removal | Yes | > |
| Document position | Auto | > |
| File format | PDF | > |
| Double-sided document last page | Double-sided | > |

FIG. 12

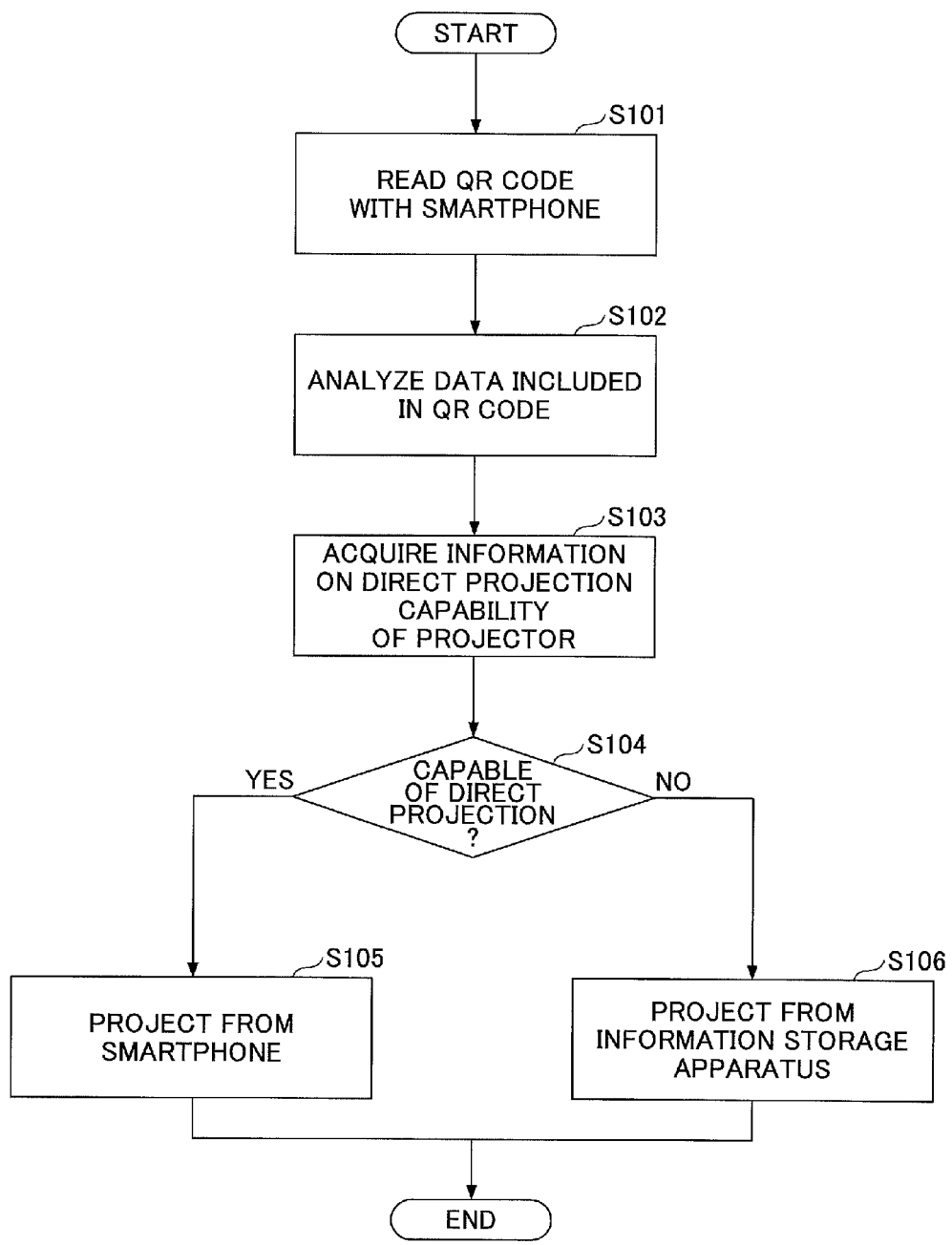

INPUT/OUTPUT SYSTEM, INPUT/OUTPUT METHOD, AND MOBILE TERMINAL

BACKGROUND OF THE INVENTION

1. Field of the Invention

The present invention relates to an input/output system, an input/output method, and a mobile terminal.

2. Description of the Related Art

In attempting to print data stored in a file server using a printer, when data conversion between the file server and the printer is not prescribed, the printer may not be able to process the data and may therefore be incapable of printing the data. Control systems for solving such a problem are known (see e.g., Japanese Laid-Open Patent Publication No. 2005-292903).

Currently, users use a variety of electronic devices for inputting/outputting electronic data such as a printer, a multifunction peripheral (MFP), and a projector; and a variety of information processing apparatuses such as a mobile phone, a smartphone, and a tablet terminal. Systems using such electronic devices and information processing apparatuses may increase their utility value by enabling cooperation between a wide variety of electronic devices and information processing apparatuses.

However, conventional systems using electronic devices and information processing apparatuses have no mechanism for enabling cooperation between an electronic device that inputs electronic data and an electronic device that outputs electronic data.

In view of the above, one aspect of the present invention relates to providing an input/output system, an input/output method, and a mobile terminal that are capable of facilitating cooperation between an electronic device that inputs electronic data and an electronic device that outputs electronic data.

SUMMARY OF THE INVENTION

According to one embodiment of the present invention, an input/output system interconnects a mobile terminal, a cooperative processing apparatus, and a plurality of electronic devices, and is configured to implement a cooperative process of prompting an electronic device corresponding to an input apparatus of the plurality of electronic devices to input electronic data and prompting an electronic device corresponding to an output apparatus of the plurality of electronic devices to output the input electronic data. The input/output system includes an acquisition unit that prompts the mobile terminal to acquire input apparatus information specifying the electronic device corresponding to the input apparatus from the electronic device corresponding to the input apparatus and acquire output apparatus information specifying the electronic device corresponding to the output apparatus from the electronic device corresponding to the output apparatus, an input control unit that controls the electronic device specified by the input apparatus information acquired by the acquisition unit to input electronic data, and an output control unit that controls the electronic device specified by the output apparatus information acquired by the acquisition unit to output the electronic data input by the input control unit in an output format compatible with the electronic device specified by the output apparatus information in a case where the electronic device specified by the output apparatus information is capable of directly outputting the input electronic data from the mobile terminal.

According to an aspect of the present invention, a mechanism may be provided for facilitating cooperation between an electronic device that inputs electronic data and an electronic device that outputs electronic data.

BRIEF DESCRIPTION OF THE DRAWINGS

FIG. 9 illustrates an exemplary folder selection screen;

FIG. 10 illustrates an exemplary read setting screen;

FIG. 12 illustrates an exemplary main screen;

FIG. 15 is a flowchart illustrating process steps for determining whether a smartphone or an information storage apparatus is to transmit a projection file.

DETAILED DESCRIPTION OF THE EMBODIMENTS

In the following, certain illustrative embodiments of the present invention are described with reference to the accompanying drawings.

<System Configuration>

Figure 1:
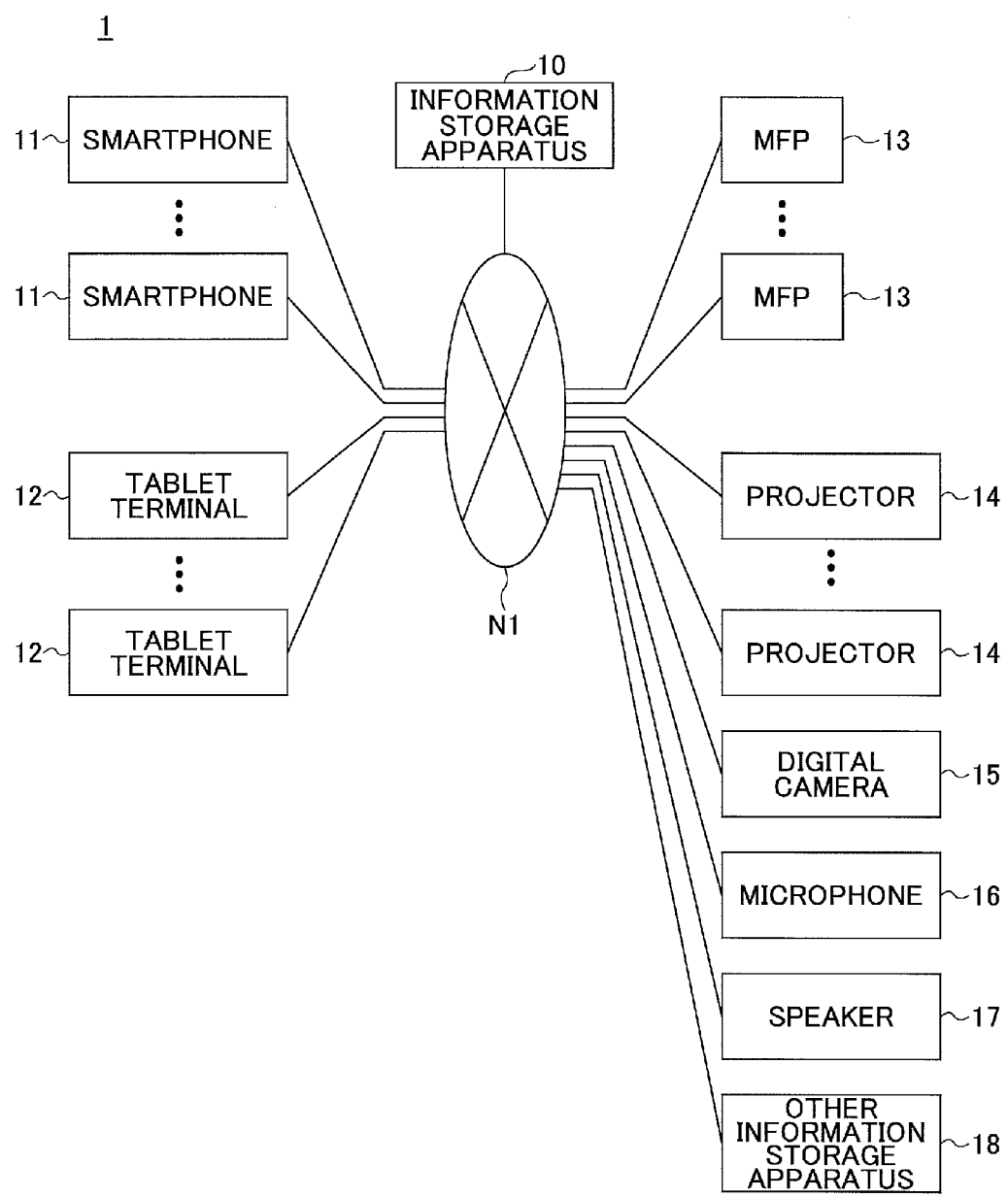
FIG. 1 illustrates an exemplary configuration of an input/output system according to an embodiment of the present invention.

FIG. 1 illustrates an exemplary configuration of an input/output system according to an embodiment of the present invention. In the input/output system 1 of FIG. 1, an information storage apparatus 10 is connected to a network N1 such as a local area network (LAN). Also, the input/output system 1 may have one or more smartphones 11, one or more tablet terminals 12, one or more MFPs 13, one or more projectors 14, one or more digital cameras 15, one or more microphones 16, one or more speakers 17, and one or more other information storage apparatuses 18 connected to the network N1, for example.

The network N1 may be a network within a private environment such as an intranet, for example. The smartphone 11 and the tablet terminal 12 are examples of mobile terminals that may be carried and operated by a user. Note that examples of the mobile terminal are not limited to the smartphone 11 and the tablet terminal 12 but may also include other devices that may be carried and operated by a user such as a mobile phone and a notebook PC (personal computer), for example.

The MFP 13 and the projector 14 are examples of electronic devices corresponding to input/output apparatuses that input/output (e.g., print, scan, project) electronic data. The digital camera 15, the microphone 16, and the speaker 17 are also examples of electronic devices that input/output electronic data. Note that examples of electronic devices are not limited to the above but may include other devices that can input/output electronic data such as a printer, a scanner, a copier, and an image display apparatus, for example.

The MFP 13 may have an image capturing function, an image forming function, and a communication function, and may be used as a printer, a facsimile machine, a scanner, and a copier, for example. The MFP 13 may act as an image scanning apparatus that generates image data by scanning a document, and an image forming apparatus that prints out (outputs) image data, for example.

The MFP 13 may also have a web browser function and may display a user interface (UI) by drawing HTML data stored within the information storage apparatus 10, for example. Further, the MFP 13 may run a JavaScript (registered trademark) program on the UI to accept requests such as a print request or a scan request from a user. The projector 14 is an example of an image display apparatus. The projector 14 may have an image projection function and a communication function, and may act as an image display apparatus that displays (outputs) image data. The digital camera 15 is an example of an image capturing apparatus. The microphone 16 and the speaker 17 are examples of audio input/output apparatuses.

The information storage apparatus 10 is an example of a cooperative processing apparatus. The information storage apparatus 10 may execute processes as a file server and sophisticated processes that cannot be performed by the MFP 13 and the projector 14, for example. The information storage apparatus 10 cooperates with information processing apparatuses such as the smartphone 11 and the tablet terminal 12 to prompt electronic apparatuses such as the MFP 13 and the projector 14 to input/output electronic data. Note that in some embodiments, the information storage apparatus 10 may be configured by a plurality of computers in a decentralized manner.

<Hardware Configuration>

Figure 2:
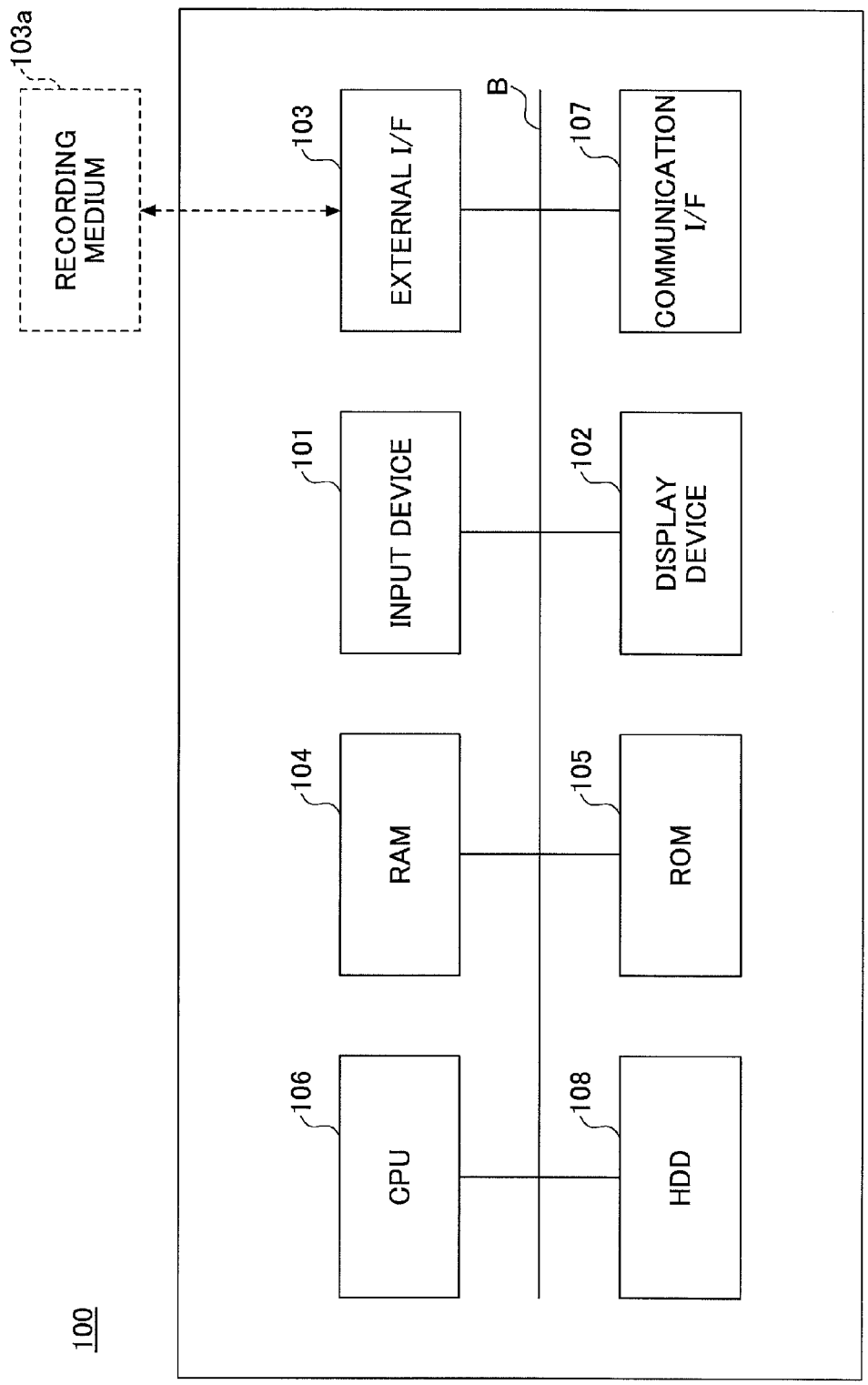
FIG. 2 illustrates an exemplary hardware configuration of a computer system according to an embodiment of the present invention.

The information storage apparatus 10 may be implemented by a computer system having a hardware configuration as illustrated in FIG. 2, for example. Also, other information processing apparatuses such as the smartphone 11 and the tablet terminal 12 may include the hardware configuration of FIG. 2. FIG. 2 illustrates an exemplary hardware configuration of a computer system according to the present embodiment.

The computer system 100 of FIG. 2 includes an input device 101, a display device 102, an external I/F 103, a RAM 104, a ROM 105, a CPU 106, a communication I/F 107 and a Hard Disk Drive (HDD) 108, which are interconnected via a bus B. The input device 101 may include a keyboard and a mouse, for example, and is used to input operation signals to the computer system 100.

The display device 102 may include a display, for example, and is configured to display processing results of the computer system 100. The communication I/F 107 is an interface for connecting the computer system 100 to the network N1. In this way, the computer system 100 may establish data communication with other apparatuses such as the mobile terminals and electronic devices via the communication I/F 107.

The HDD 108 is a nonvolatile storage device storing programs and data. The programs stored in the HDD 108 may include an Operating System (OS) corresponding to basic software controlling the overall computer system 100 and application software providing various functions under the control of the OS, for example. The HDD 108 manages the stored programs and data using a predetermined file system and/or DataBase (DB).

The external I/F 103 is an interface between the computer system 100 and external devices. The external devices may include a recording medium 103a, for example. In this way, the computer system 100 may read/write information from/on the recording medium 103a via the external I/F 103. Examples of the recording medium 103a include a flexible disk, a CD, a Digital Versatile Disk (DVD), a SD memory card, a Universal Serial Bus memory (USB memory), etc.

The ROM 105 is a nonvolatile semiconductor memory (storage device) and thus can retain programs and/or data even after the power is turned off. The ROM 105 may store programs and data such as a Basic Input/Output System (BIOS) to be executed when the computer system 100 is started, OS settings, and network settings, for example. The RAM 104 is a volatile semiconductor memory (storage device) that temporarily stores programs and/or data.

The CPU 106 is a processing unit that controls overall operations and functions of the computer system 100 by reading programs and/or data from storage device(s) such as the ROM 105 and/or HDD 108 to the RAM 140 and executing corresponding processes.

The computer system 100 according to the present embodiment may implement various processes described below using the above hardware configuration.

<Mobile Terminal>

Figure 3:
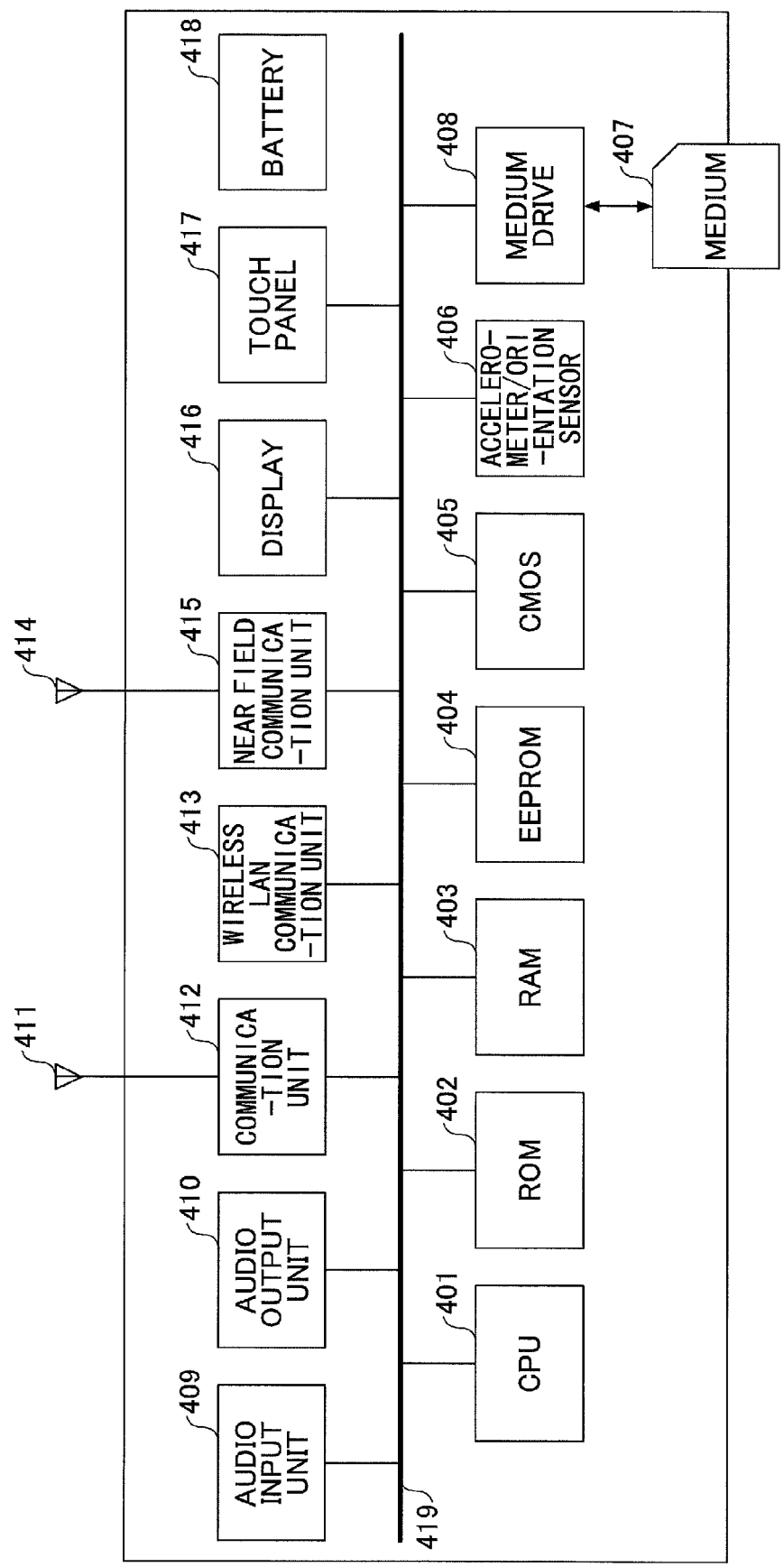
FIG. 3 illustrates an exemplary hardware configuration of a mobile terminal according to an embodiment of the present invention.

FIG. 3 illustrates an exemplary hardware configuration of the mobile terminal according to the present embodiment. The mobile terminal of FIG. 3 includes a CPU 401, a ROM 402, a RAM 403, an EEPROM 404, a CMOS sensor 405, an accelerometer/orientation sensor 406, and a medium drive 408.

The CPU 401 controls overall operations of the mobile terminal. The ROM 402 stores basic input/output programs. The RAM 403 is used as a working area for the CPU 401. The EEPROM 404 reads/writes data according to control by the CPU 401. The CMOS sensor 405 captures an image of an imaging object and obtains image data according to control by the CPU 401. The accelerometer/orientation sensor 406 may be an electromagnetic compass or a gyrocompass that detects geomagnetism or an accelerometer, for example. The medium drive 408 may control data reading/writing from/on a recording medium 407 such as a flash memory. Such control by the medium drive 408 enables pre-recorded data to be freely retrieved from the recording medium 407 and new data to be written on the recording medium 407, for example.

Note that the EEPROM 404 may store association information required for network setting, for example. In the present embodiment, applications for executing cooperative processing services (referred to as "cooperative processing applications" hereinafter) may be stored in the EEPROM 404 or the recording medium 407.

Also, the CMOS sensor 405 is an image sensor that converts light into electric charges and produces a computerized image of an imaging object. Note that in some embodiments, a CCD (charge coupled device) sensor may be used instead of the CMOS sensor, for example.

The mobile terminal also includes an audio input unit 409, an audio output unit 410, an antenna 411, a communication unit 412, a wireless LAN communication unit 413, a near field communication unit antenna 414, a near field communication unit 415, a display 416, a touch panel 417, and a bus line 419.

The audio input unit 409 converts audio into an audio signal. The audio output unit 410 converts an audio signal into audio. The communication unit 412 uses the antenna 411 to establish communication with a nearby base station using a wireless communication signal. The wireless LAN communication unit 413 establishes wireless communication with an access point according to the IEEE 80411 standard. The near field communication unit 415 establishes near field communication (Bluetooth (registered trademark) communication) using the near field communication antenna 414.

The display 416 may be a liquid crystal display (LCD) or an organic EL (electroluminescence) display that displays an image of an imaging object and various icons, for example. The touch panel 417 may be a pressure-sensitive touch panel or an electrostatic touch panel that is placed on the display 416 and is configured to detect a touch position of a touch by a finger or a touch pen on the display 416, for example. The bus line 419 may be an address bus or a data bus for establishing electrical connection between the above-described components, for example.

The mobile terminal also includes a dedicated battery 418. The mobile terminal 418 is driven by the battery 418. The audio input unit 409 includes a microphone for inputting audio. The audio output unit 410 includes a speaker for outputting audio.

The mobile terminal of the present embodiment may implement various processes described below using the above-described hardware configuration.

<Software Configuration>

<<Information Storage Apparatus 10>>

Figure 4:
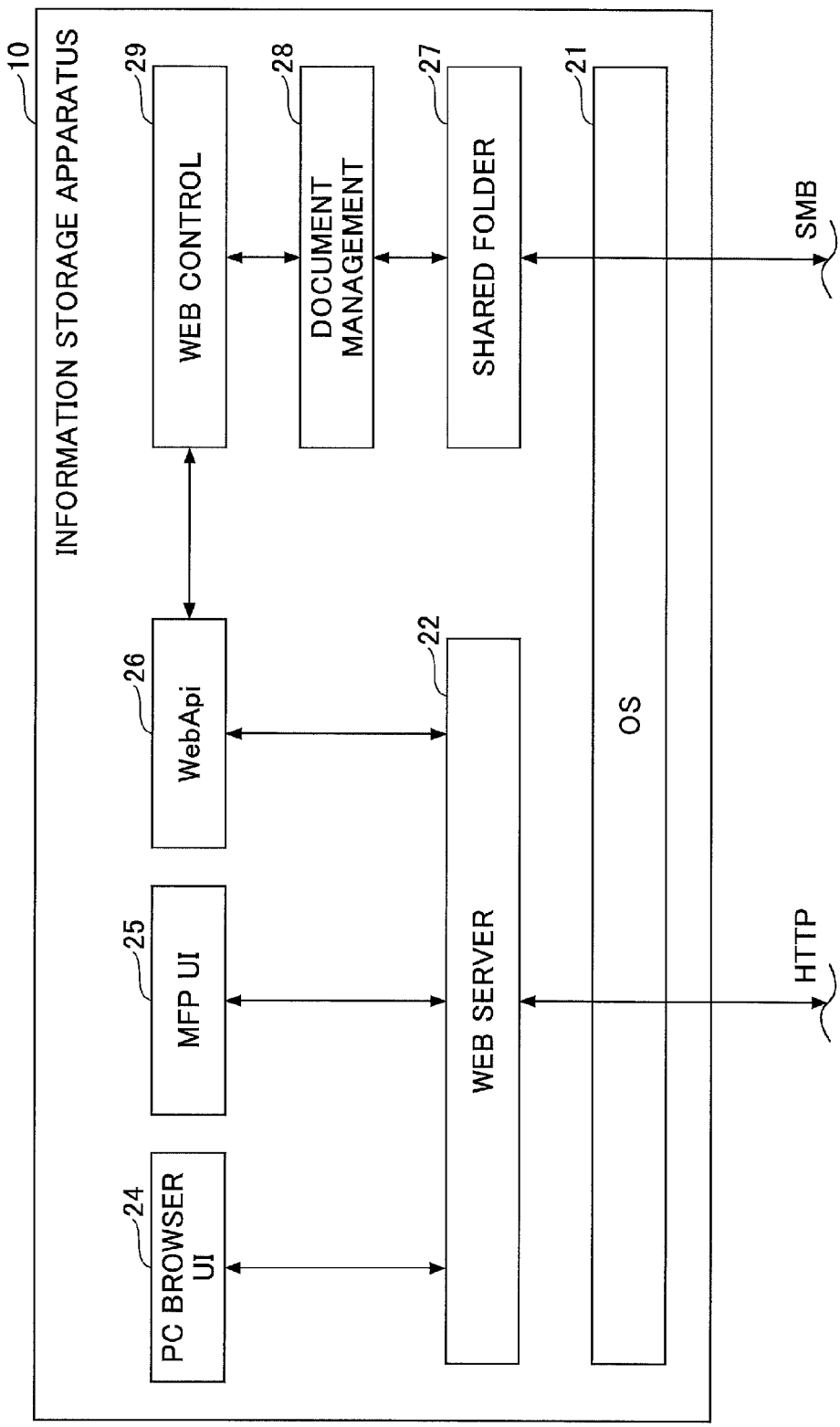
FIG. 4 illustrates an exemplary functional configuration of an information storage apparatus according to an embodiment of the present invention.

The information storage apparatus 10 according to the present embodiment may be implemented by processing blocks as illustrated in FIG. 4, for example. FIG. 4 illustrates an exemplary functional configuration of the information storage apparatus 10. The information storage apparatus 10 executes programs to implement an OS 21, a Web server 22, a PC browser UI 24, a MFP UI 25, a WebApi 26, a shared folder 27, a document management unit 28, and a Web control unit 29.

The OS 21 is an operating system for the information storage apparatus 10, and controls the overall system of the information storage apparatus 10. The OS 21 may be, for example, Windows (registered trademark), Linux (registered trademark), or some other operating system.

The Web server 22 is software for transmitting and receiving information using Hyper Text Transfer Protocol (HTTP). The Web server 22 may be, for example, Apache Tomcat (registered trademark), IIS (registered trademark), or some other web server.

The PC browser UI 24 displays a system setting screen page at the mobile terminal in response to a HTTP request. A user may change settings via the system setting screen page using a Web browser (not shown).

The MFP UI 25 displays a screen page including code information such as a QR code (registered trademark) on an electronic device such as the MFP 13 in response to a HTTP request. The QR code is a type of matrix code (two-dimensional code). The MFP UI 25 may also display a print screen or a scan screen on the electronic device in response to a HTTP request. A user may prompt printing or scanning operations using the web browser function of the MFP 13, for example.

The WebApi (Web application programming interface) 26 can be used via the network N1. The WebApi 26 receives a HTTP request, executes a process according to the HTTP request, and sends an HTTP response. The WebApi 26 also generates a QR code.

The WebApi 26 is a pre-defined interface for receiving a request from the mobile terminal such as the smartphone 11 and the tablet terminal 12 and may be configured by functions and/or classes, for example.

Also, the WebApi 26 of the information storage apparatus 10 may be provided as a Software Development Kit (SDK) to a developer that develops applications to be installed in the mobile terminal. The developer can develop an application using the SDK. The SDK may also be provided to a third vendor other than the provider of the information storage apparatus 10. The third vendor can develop an application using the SDK. The application developed using the SDK may be installed in the mobile terminal.

By providing the WebApi 26 of the information storage apparatus 10 as a SDK, the mobile terminal may install not only an application developed by the provider of the information storage apparatus 10 but also an application developed by a third vendor.

The shared folder 27 is a folder published on the network N1 using the Server Message Block (SMB) protocol. A user may access the shared folder 27 using the mobile terminal such as the smartphone 11 and the tablet terminal 12.

The document management unit 28 manages a file placed in the shared folder 27 and carries out data conversion in response to a request from the Web control unit 29. Note that in the present embodiment, a file corresponds to one form of electronic data. The Web control unit 29 carries out a process of controlling the document management unit 28 according to a request from the WebApi 26.

Note that, generally, two processes operate in the information storage apparatus 10. One of these two processes includes the Web server 22, the PC browser UI 24, the MFP UI 25, and the WebApi 26. The other process includes the shared folder 27, the document management unit 28, and the Web control unit 29. The WebApi 26 and the Web control unit 29 establish inter-process communication with each other.

<<Mobile Terminal>>

Figure 5:
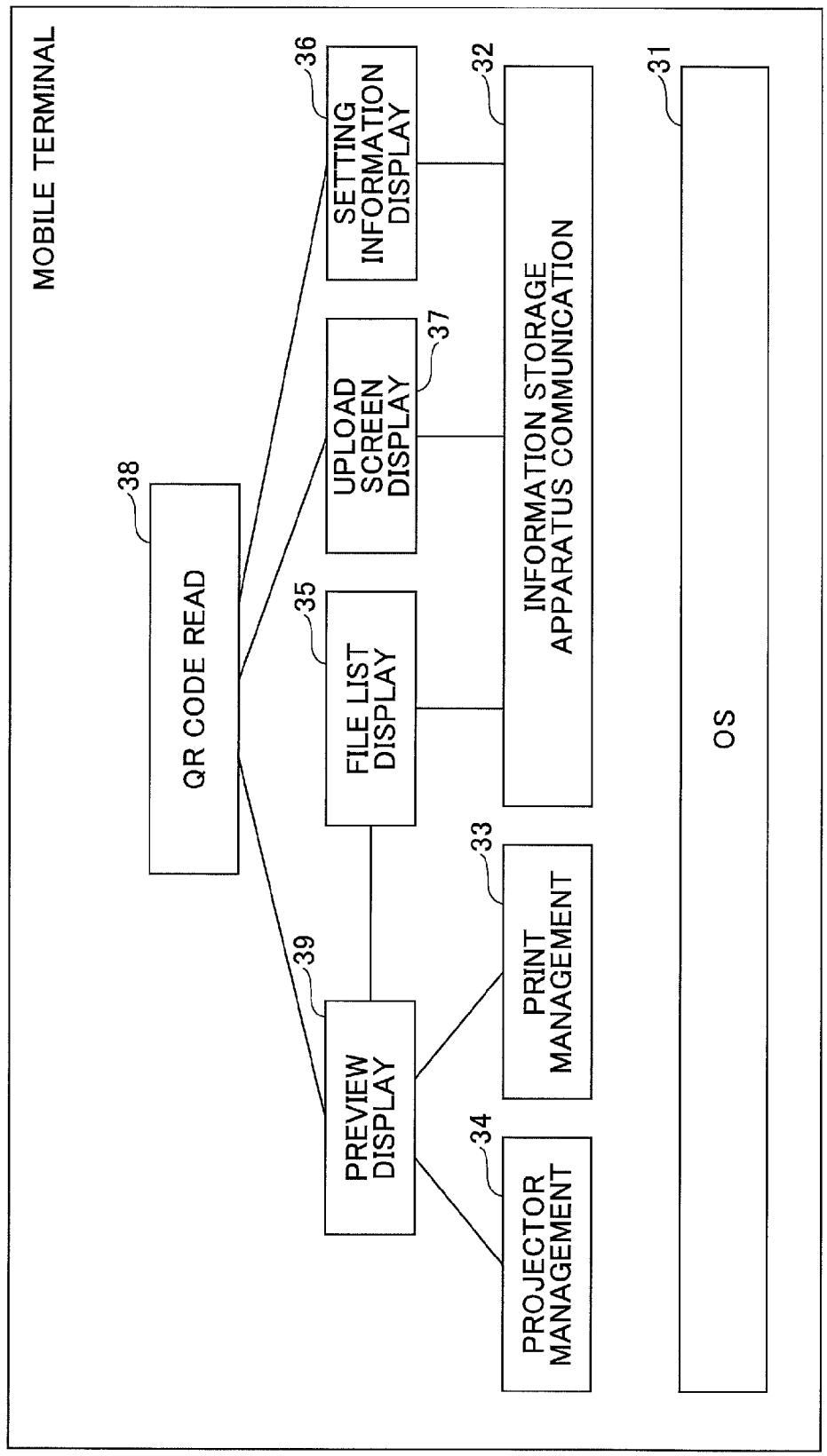
FIG. 5 illustrates an exemplary functional configuration of the mobile terminal.

The mobile terminal of the present embodiment may be implemented by process blocks as illustrated in FIG. 5, for example. FIG. 5 illustrates an exemplary functional configuration of the mobile terminal of the present embodiment. The mobile terminal may execute programs to implement an OS 31, an information storage apparatus communication unit 32, a print management unit 33, a projector management unit 34, a file list display unit 35, a setting information display unit 36, an upload screen display unit 37, a QR code read unit 38, and a preview display unit 39.

The OS 31 is an operating system for the mobile terminal. For example, iOS (registered trademark) or Android (registered trademark) may be used as the OS 31 to enable overall system control of the mobile terminal.

The information storage apparatus communication unit 32 exchanges information with the WebAPI 26 of the information storage apparatus 10 using HTTP. The information storage apparatus communication unit 32 also accesses the shared folder 27 of the information storage apparatus 10 using SMB.

For example, the file list display unit 35, the setting information display unit 36, and the upload screen display unit 37 may use the information storage apparatus communication unit 32 to acquire electronic data and information from the information storage apparatus 10 and send a process request to the information storage apparatus 10.

The file list display unit 35 displays a list of files stored within the information storage apparatus 10 and accepts a file selection by a user. The setting information display unit 36 may enable designation of connection settings with the information storage apparatus 10 and display the setting information at the mobile terminal, for example. The upload screen display unit 37 displays a menu for uploading a file to the information storage apparatus 10 and uploads a file to the information storage apparatus 10.

An exemplary method of uploading data to the information storage apparatus 10 may involve reading a QR code of the MFP 13, having the MFP 13 scan an image, and uploading the scan data in the information storage apparatus 10. Another exemplary method of uploading data to the information storage apparatus 10 may involve uploading data of the mobile terminal to the information storage apparatus 10. Another exemplary method of uploading data to the information storage apparatus 10 may involve uploading data captured by a camera function of the mobile terminal to the information storage apparatus 10.

The preview display unit 39 displays a preview of a file selected by a user from a list of files displayed by the file list display unit 35. The preview display unit 39 also displays a menu for projection or printing. The projector management unit 34 performs processes such as searching/registering the projector 14 and prompting the projector 14 to project an image of a selected file. The print management unit 33 performs processes such as searching/registering the MFP 13 and prompting the MFP 13 to print out a selected file.

The QR code read unit 38 may be used by the preview display unit 39, the setting information display unit 36, and the upload screen display unit 37 upon reading a QR code using the mobile terminal. The QR code read by the QR code read unit 38 may be a QR code for specifying the MFP 13 that is to be used for printing or scanning data, or a QR code for specifying the projector 14 that is to be used for image projection, for example.

<Detailed Processes>

In the following, detailed processes of the input/output system 1 according to the present embodiment are described.

<<Scan to Projection>>

Figure 6:
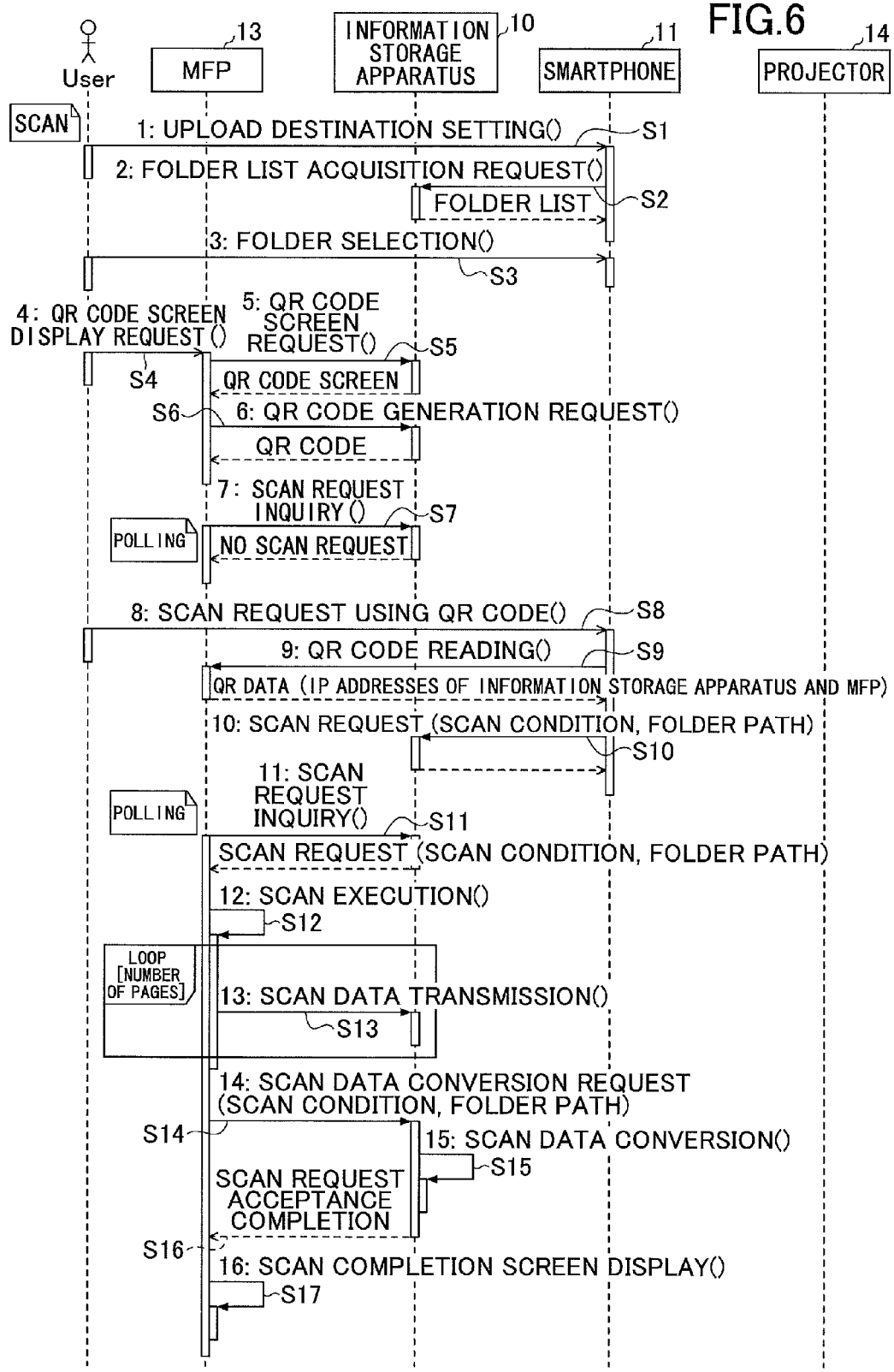
FIG. 6 is a sequence chart illustrating exemplary process steps executed by the input/output system.
Figure 7:
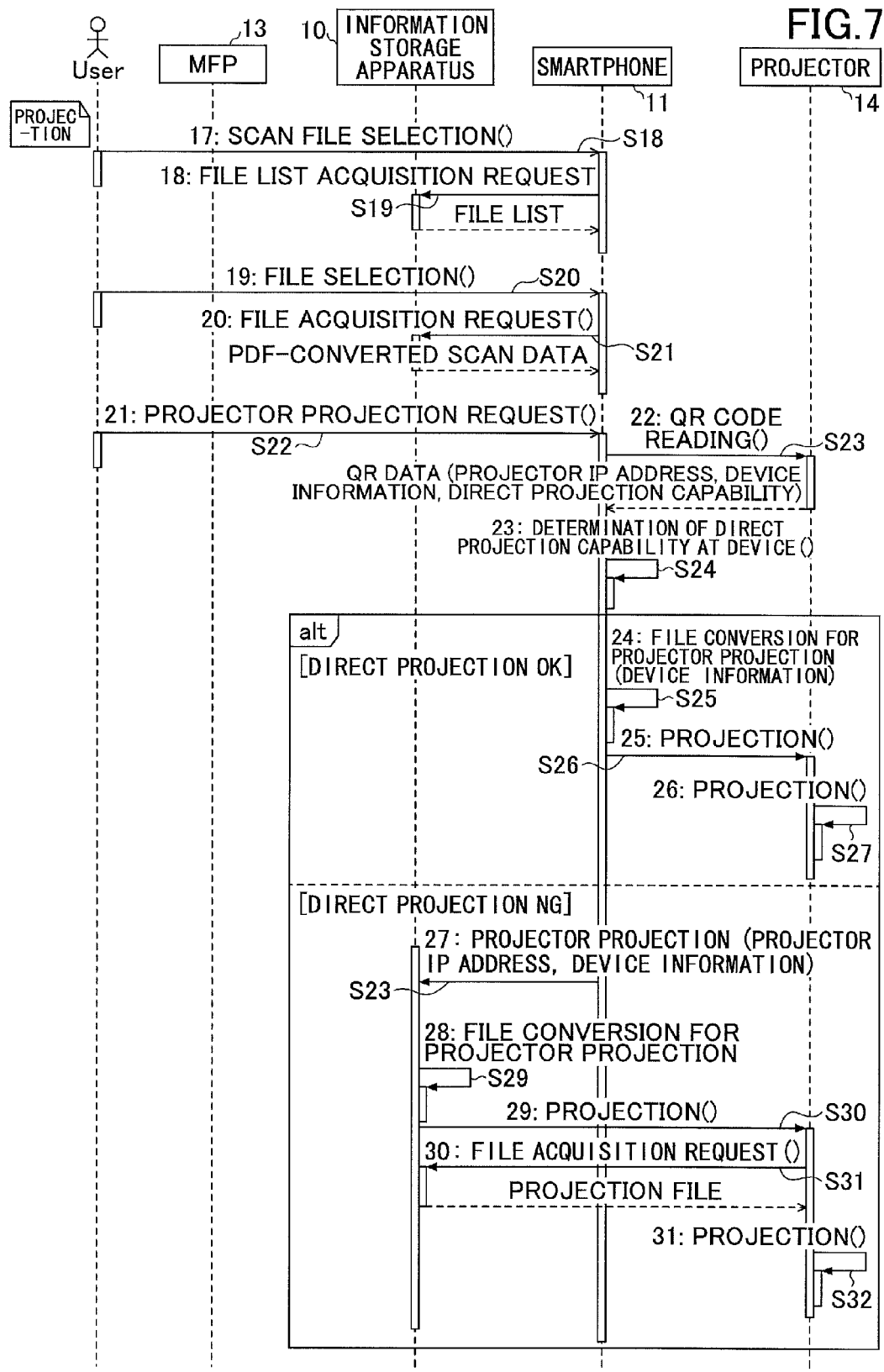
FIG. 7 is a sequence chart illustrating further exemplary process steps executed by the input/output system.

Herein, exemplary processes are described that may be executed in the case of prompting the MFP 13 to scan an image and prompting the projector 14 to project the scan data. FIGS. 6 and 7 are sequence charts illustrating process steps executed in the input/output system 1 of the present embodiment.

Figure 8:
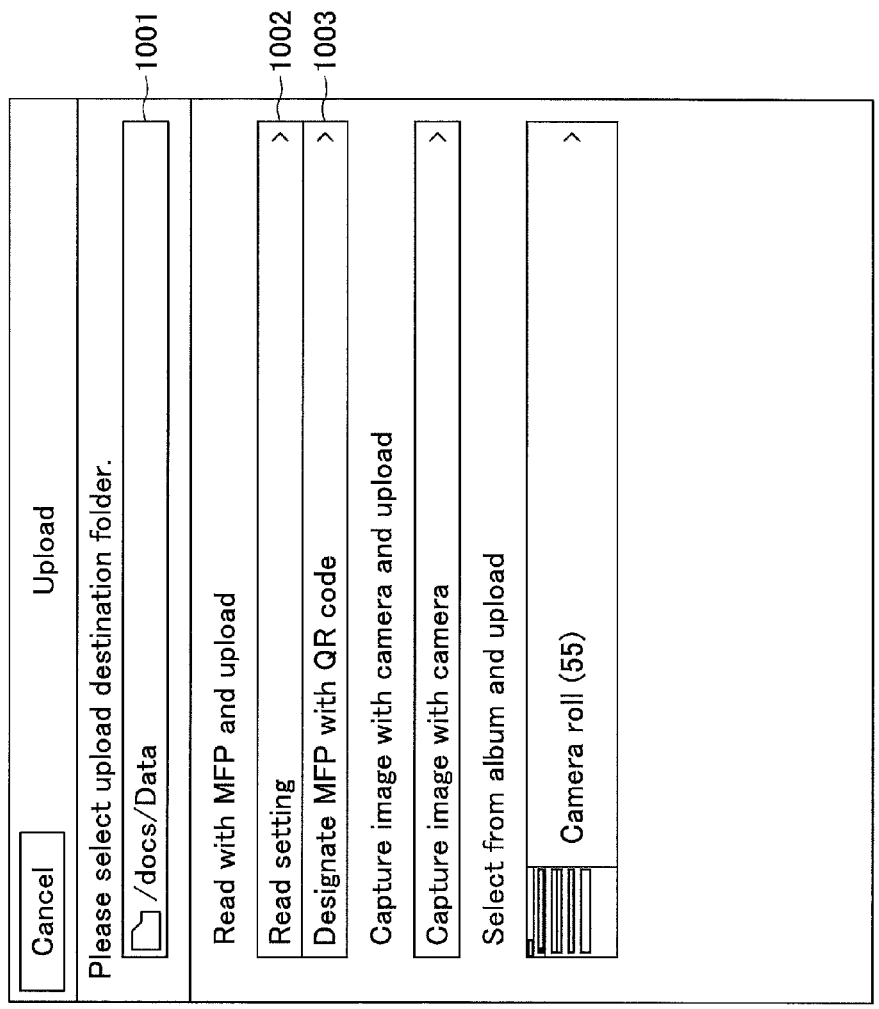
FIG. 8 illustrates an exemplary upload screen.

In step S1, a user operates the smartphone 11 to request for the display of an upload screen. FIG. 8 illustrates an exemplary upload screen that may be displayed at the smartphone 11. When an upload destination setting button 1001 is pressed, the smartphone 11 sends a folder list request to the information storage apparatus 10 in step S2, and acquires the requested folder list from the information storage apparatus 10. In turn, the smartphone 11 may display a folder selection screen as illustrated in FIG. 9, for example. FIG. 9 illustrates an exemplary folder selection screen.

In step S3, the user operates the smartphone 11 to select an upload destination folder from the folder list displayed in the folder selection screen of FIG. 9. Note that when the user presses a read setting button 1002 of the upload screen of FIG. 8, a read setting screen as illustrated in FIG. 10 may be displayed at the smartphone 11, for example.

FIG. 10 illustrates an exemplary read setting screen. The user may operate the smartphone 11 to set up scan conditions via the read setting screen of FIG. 10. The read setting screen illustrated in FIG. 10 enables a user to set scan conditions relating to the document type, resolution, sides, document orientation, blank page removal, document position, file format, and double-sided document last page.

In step S4, the user operates the MFP 13 to request for the display of a QR code screen. Upon receiving the QR code screen display request from the user, the MFP 13 sends a QR code screen request to the information storage apparatus 10 in step S5 and acquires the requested QR code screen from the information storage apparatus 10. In step S6, the MFP 13 sends a QR code generation request to the information storage apparatus 10 and acquires the generated QR code from the information storage apparatus 10. Then, the MFP 13 displays the acquired QR code screen including the acquired QR code.

The QR code displayed within the QR code screen includes the IP address of the information storage apparatus 10 that has generated the QR code and the IP address of the MFP 13 displaying the QR code.

While displaying the QR code screen including the QR code, the MFP 13 polls the information storage apparatus 10 to check whether there is a scan request using the QR code. The process of inquiring whether there is a scan request at the information storage apparatus 10 may be performed as a background process. In step S7, the MFP 13 makes an inquiry as to whether there is any scan request at the information storage apparatus 10, but receives a response indicating no scan requests are present.

Note that the order of the process steps S1-S3 for selecting the upload destination file and setting up scan conditions and the process steps S4-S6 for displaying the QR code screen are not limited to the above order, but may be altered.

In step S8, the user operates the smartphone 11 to press a "designate MFP with QR code" button 1003 displayed at the upload screen of FIG. 8 and select scanning using a QR code.

Figure 11:
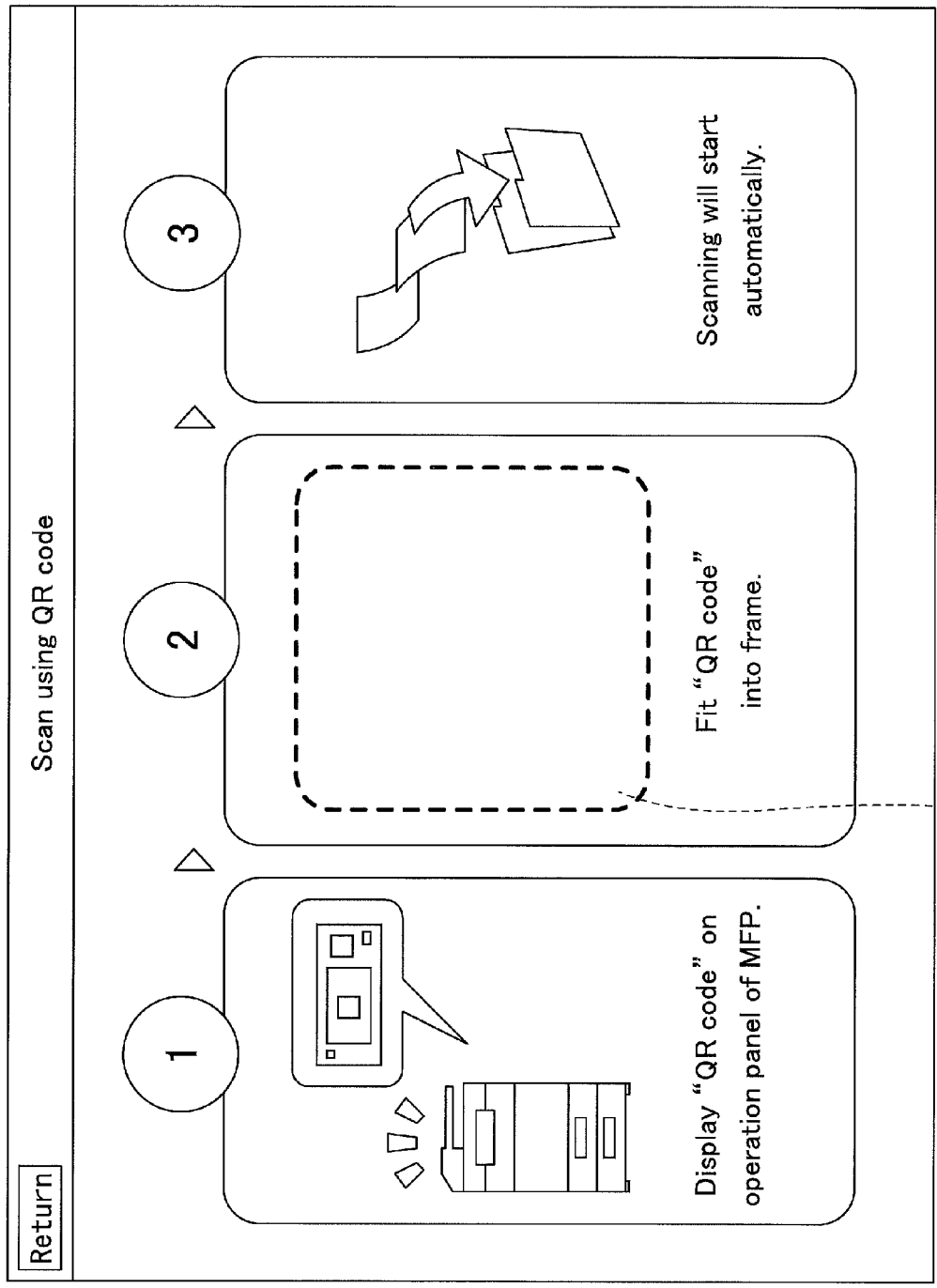
FIG. 11 illustrates an exemplary QR code read screen.

When the "designate MFP with QR code" button 1003 is pressed, the smartphone 11 may display a QR code read screen as illustrated in FIG. 11, for example. FIG. 11 illustrates an exemplary QR code read screen. The QR code read screen of FIG. 11 includes a QR code display region 1101. The QR code display region 1101 is where an image captured by a camera function of the smartphone 11 is displayed.

In step S9, the user captures an image of the QR code on the QR code screen displayed by the MFP 13 using the camera function of the smartphone 11. The user adjusts the position of the smartphone 11 with respect to the QR code on the QR code screen so that the image of the QR code captured by the camera function of the smartphone 11 may be displayed within the QR code display region 1101 of the QR code read screen.

The smartphone 11 reads the QR code on the QR code screen. As described above, the QR code includes the IP address of the information storage apparatus 10 corresponding to the transmission destination of scan data and the IP address of the MFP 13 corresponding to the sender of the scan data.

In step S10, the smartphone 11 uses the IP address of the information storage apparatus 10 corresponding to the scan data transmission destination to send a scan request including an upload destination folder path and scan conditions to the information storage apparatus 10.

In step S11, the MFP 13 polls the information storage apparatus 10 to check whether there is a scan request using the QR code in a manner similar to step S7. By making the inquiry as to the presence of a scan request to the information storage apparatus 10, the MFP 13 receives the scan request including the upload destination folder path and the scan conditions from the information storage apparatus 10. In step S12, the MFP 13 executes scanning according to the scan conditions included in the received scan request.

In step S13, the MFP 13 transmits scan data (image data) of a document one page at a time to the upload destination folder path of the information storage apparatus 10 corresponding to the scan data transmission destination and stores the scan data in the upload destination folder. In step S13, transmission of scan data is repeated for the number of pages included in the scanned document. The scan data may be in JPEG format or TIFF format depending on whether the scan data is in color or black and white.

After scanning all pages of the document, the MFP 13 sends a scan data conversion request to the information storage apparatus 10 in step S14. The scan data conversion request includes the upload destination folder path and the scan conditions.

In step S15, the information storage apparatus 10 consolidates the scan data of multiple pages transmitted from the MFP 13 and converts the scan data into a PDF file. Note that the data format into which the scan data is converted in step S15 is not limited to the PDF file format. That is, the scan data may be converted into some other data format for consolidating the scan data or a data format (display format) for enabling display of the scan data by the smartphone 11, for example.

In step S16, the information storage apparatus 10 sends a scan request acceptance completion notification to the MFP 13. Upon receiving the scan request acceptance completion notification, the MFP 13 displays a scan completion screen indicating that scanning has been completed in step S17.

Figure 12:
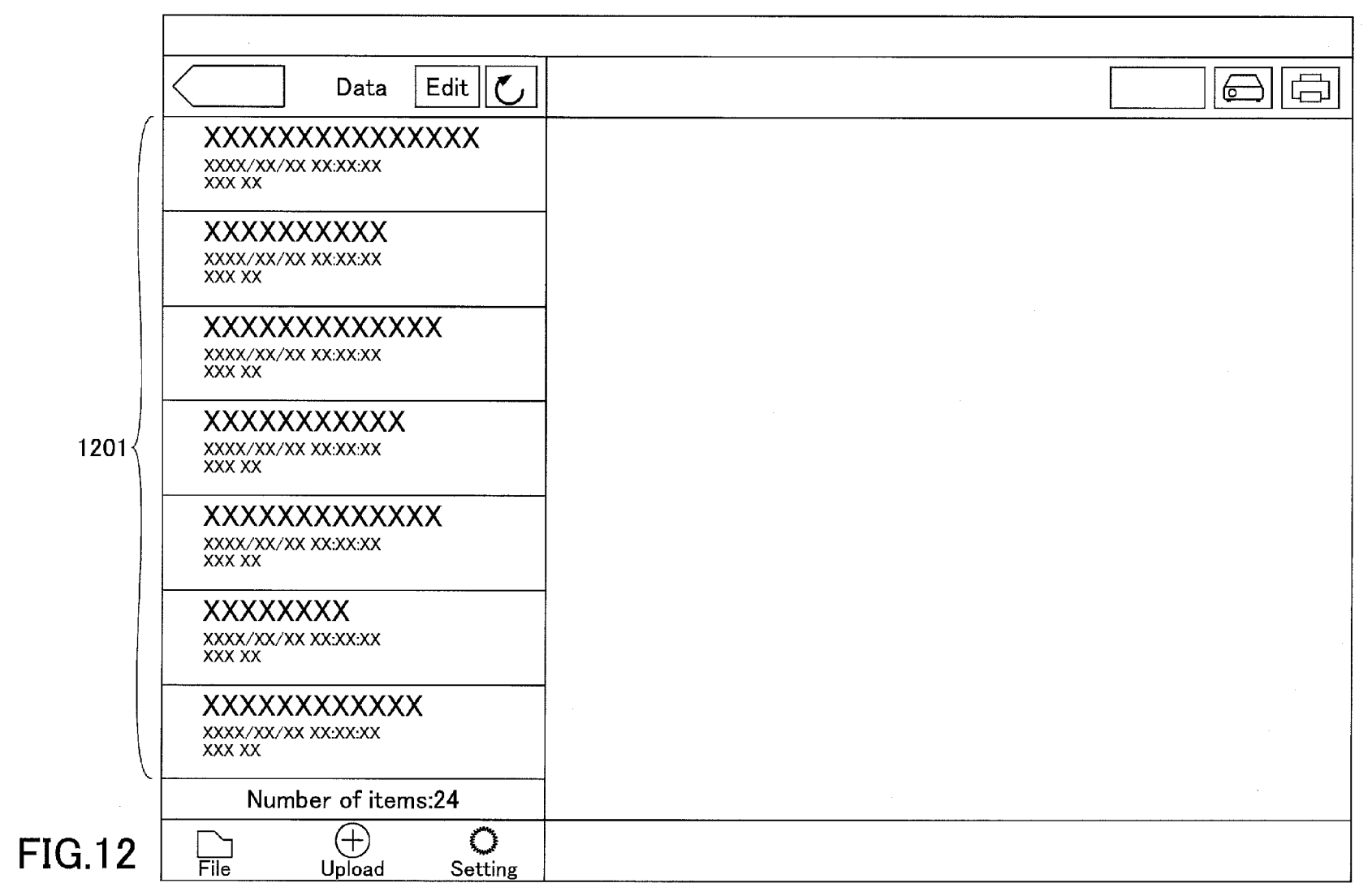

Referring to FIG. 7, in step S18, the user operates the smartphone 11 to request for the display of a main screen as illustrated in FIG. 12 for selecting a scan file. FIG. 12 illustrates an exemplary main screen.

Upon receiving the main screen display request from the user, the smartphone 11 sends a file list request to the information storage apparatus 10 in step S19 and acquires the requested file list from the information storage apparatus 10. In turn, the smartphone 11 displays the main screen including a file list 1201 as illustrated in FIG. 12, for example.

In step S20, the user operates the smartphone 11 to select a file (referred to as "scan file") from the file list of FIG. 12. In step S21, the smartphone 11 sends a file acquisition request to the information storage apparatus 10 to acquire (download) the scan file selected by the user from the information storage apparatus 10.

Figure 13:
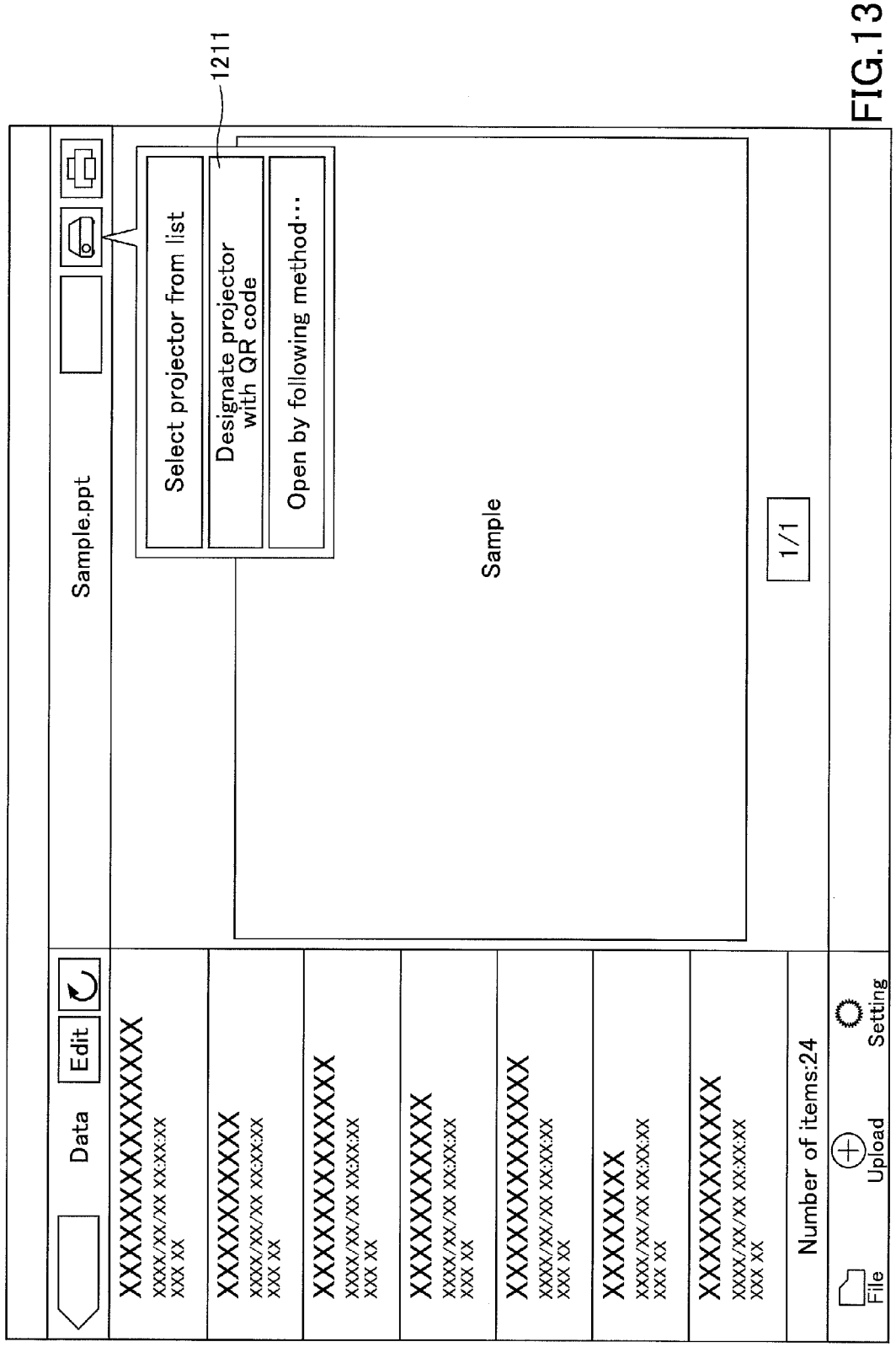
FIG. 13 illustrates an exemplary main screen that displays a preview.

The smartphone 11 may display a preview of the downloaded scan file as illustrated in FIG. 13, for example. FIG. 13 illustrates an exemplary main screen displaying a preview.

In step S22, the user operates the smartphone 11 to select (press) a "select projector with QR code" button 1211 displayed on the main screen of FIG. 13 for prompting image projection by a projector. When the "select projector with QR code" button 1211 is pressed, the smartphone 11 may display a QR code read screen as illustrated in FIG. 14, for example.

Figure 14:
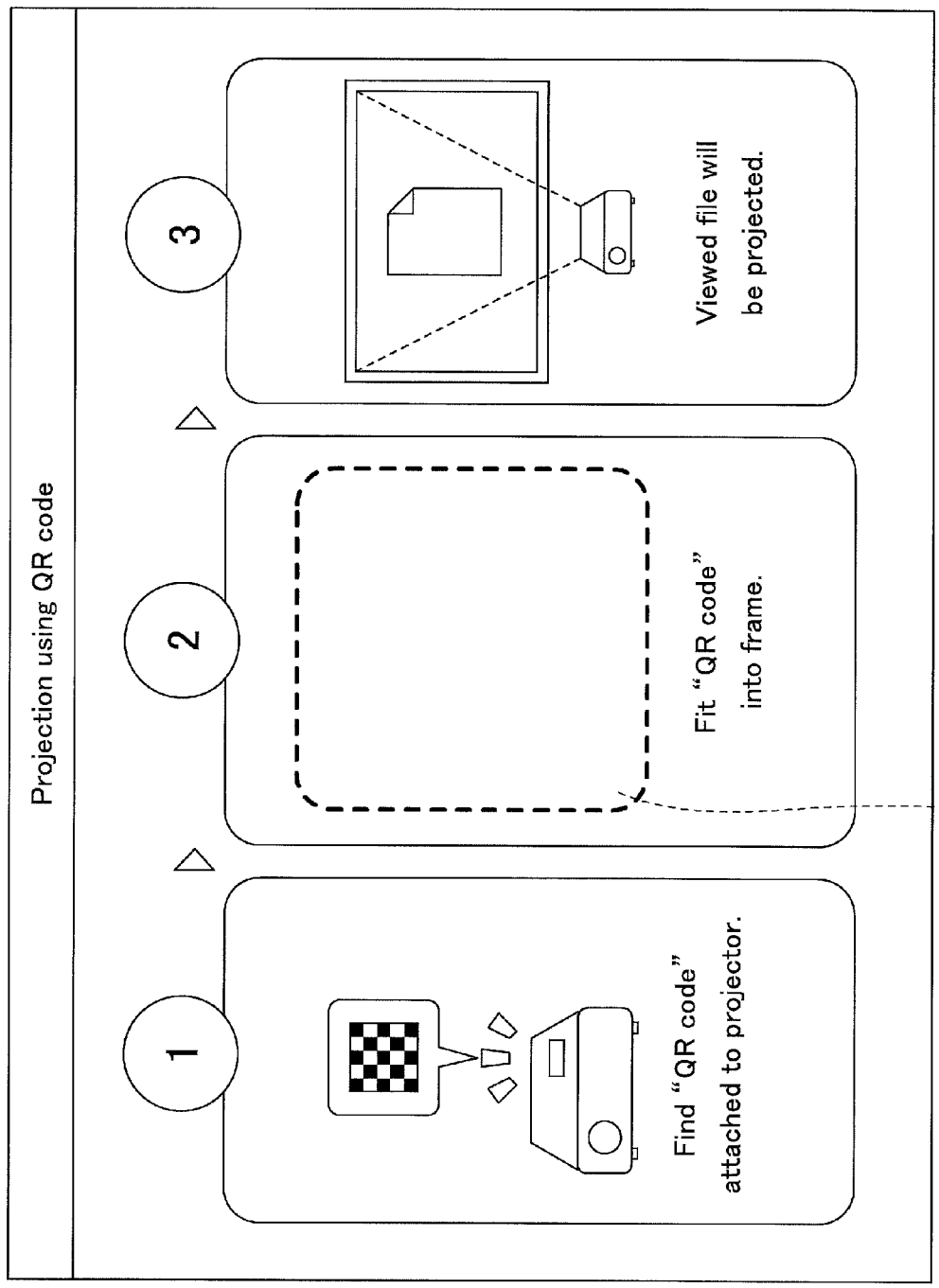
FIG. 14 illustrates another exemplary QR code read screen.

FIG. 14 illustrates an exemplary QR code read screen. The QR code read screen of FIG. 14 includes a QR code display region 1301. The QR code display region 1301 is where an image captured by the camera function of the smartphone 11 is displayed.

In step s23, the user captures an image of the QR code of the projector 14 using the camera function of the smartphone 11. For example, the QR code of the projector 14 may be attached to a chassis of the projector 14. In some embodiments, the projector 14 may project a screen indicating the QR code of the projector 14.

The user adjusts the position of the smartphone 11 with respect to the QR code of the projector 14 so that the image of the QR code captured by the camera function of the smartphone 11 may be displayed within the QR code display region 1301 of the QR code read screen.

The smartphone 11 reads the QR code of the projector 14. The QR code of the projector 14 includes the IP address, device information, and direct projection capability information of the projector 14 that is to project the scan file. The device information of the projector 14 includes information on communication protocols such as HTTP and SMB that may be used by the projector 14 and information on data formats such as JPRG and PDF that may be used by the projector 14. The direct projection capability information is an example of direction output capability information indicating whether the projector 14 is capable of directly projecting (outputting) data from the smartphone 11.

In step S24, based on the direct projection capability information, the smartphone 11 transmits a file to the projector 14 to determine whether the projector 14 is capable of directly projecting data from the smartphone 11.

In step S25, upon determining that the projector 14 is capable of direct projection, the smartphone 11 converts the PDF scan file acquired in step S21 into a file in a data format compatible with projection by the projector 14. The scan file is converted into a file in a compatible data format based on the device information of the projector 14 including information on the data format that may be used by the projector 14.

In step S26, the smartphone 11 transmits the file in the compatible data format (projection file) to the projector 14. In step S27, the projector 14 projects the projection file received from the smartphone 11.

On the other hand, in a case where the smartphone determines in step S24 that the projector 14 is not capable of direct projection, in step S28, the smartphone 11 sends a scan file projection request to the information storage apparatus 10 designating the IP address and the device information of the projector 14. In step S29, the information storage apparatus 10 converts the PDF scan file into a projection file in a compatible data format that may be used by the projector based on the device information of the projector 14.

In step S30, the information storage apparatus 10 sends a projection start request to the projector 14 using the IP address of the projector 14. In step S31, the projector 14 sends a file acquisition request to the information storage apparatus 10 and receives the projection file from the information storage apparatus 10. In step S32, the projector 14 projects the received projection file.

By implementing the process steps illustrated in FIGS. 6 and 7, cooperation may be facilitated between the MFP 13 that is to scan (input) data and the projector 14 that is to project (output) the data. Note that although the user explicitly selects data input by scanning in step S8 of FIG. 6, in other embodiments, such a step may be omitted and the selection may be implicitly recognized based on function information included in the QR code of the MFP 13, for example.

Also, although the user explicitly selects data output by projection in step S22 of FIG. 7, in other embodiments, the selection may be implicitly recognized based on function information included in the QR code of the projector 14, for example.

In a further embodiment, after step S9 of FIG. 6, an error determination step may be made for determining whether the function explicitly selected by the user in step S8 matches a function represented by the function information included in the QR code of the MFP 13. For example, an error may be detected in a case where the function explicitly selected by the user in step S8 is not included in the function information of the QR code of the MFP 13.

Also, after step S23 of FIG. 7, an error determination step may be made for determining whether the function explicitly selected by the user in step S22 matches a function represented by the function information of the QR code of the projector 14. For example, an error may be detected in a case where the function explicitly selected by the user in step S22 is not included in the function information of the QR code of the projector 14.

Also, although the MFP 13 polls the information storage apparatus 10 to check whether there is a scan request at the information storage apparatus 10 in FIG. 6, in other embodiments, the smartphone 11 may send a scan request to the MFP 13.

In the following, the process steps S23 and S24 performed by the smartphone 11 are described in greater detail. FIG. 15 is a flowchart illustrating process steps for determining whether the smartphone 11 or the information storage apparatus 10 is to transmit the projection file.

In step S101, the smartphone 11 captures and reads the QR code of the projector 14 using the camera function of the smartphone 11. In step S102, the smartphone 11 analyzes the data included in the read QR code.

In step S103, based on the analysis of step S102, the smartphone 11 acquires the IP address, the device information, and the direct projection capability information of the projector 14 that is to project the scan file.

In step S104, the smartphone 11 determines whether the projector 14 is capable of direct projection based on the direct projection capability information acquired in step S103. If the projector 14 is capable of direct projection, the smartphone 11 prompts the projector 14 to directly project data from the smartphone 11 in step S105. Note that the process of step S105 corresponds to steps S25-S27 of FIG. 7.

If the projector 14 is not capable of direct projection, the smart phone 11 prompts the projector 14 to project data via the information storage apparatus 10 in step S106. Note that the process of step S106 corresponds to steps S28-S32 of FIG. 7.

In the present embodiment, the direct projection capability information is included in the QR code of the projector 14 so that the smartphone 11 may determine whether to have the projector 14 use a projection method of directly projecting data from the smartphone 11 or the projecting data via the information storage apparatus 10 depending on whether the projector 14 is capable of direct projection. In an alternative embodiment, the determination of whether to use the method of directly projecting (outputting) data from the smartphone 11 or the method of projecting (outputting) data via the information storage apparatus 10 may be made based on a combination of device information.

For example, in a case where device information of an input apparatus designates scanning, and device information of an output apparatus designates the projector 14, a method of directly outputting data from the smartphone 11 may be used, and in a case where device information of an input apparatus designates scanning and device information of an output apparatus designates the MFP 13, a method of outputting data via the information storage apparatus 10 may be used. Note that in the above-described embodiment, the direct projection capability information is included in the QR code to determine whether the smartphone 11 is capable of directly communicating with the electronic device corresponding to the output apparatus. However, the present invention is not limited to such an embodiment. For example, the IP address and device information of the output apparatus may be included in the QR code and a determination of whether the smartphone 11 is capable of direct communication with the output apparatus may be made based on whether the smartphone 11 can access the output apparatus using the IP address acquired from the QR code. Also, note that the determination of the projection method may be performed by the smartphone 11 as in the above-described embodiment, or alternatively, the device information may be transmitted to the information storage apparatus 10 and the determination of the projection method may be made by the information storage apparatus 10, for example.

SUMMARY

In the input/output system according to the present embodiment, a user may hold a mobile terminal such as the smartphone 11 or the tablet terminal 12 against an electronic device such as the MFP 13 or the projector 14 to acquire information such as a QR code specifying the electronic device. In this way, the user may easily designate an electronic device for inputting electronic data and an electronic device for outputting electronic data from a plurality of electronic devices.

Also, in the input/output system according to the present embodiment, cooperation may be facilitated between an electronic device for inputting electronic data, an electronic device for outputting electronic data, and a cooperative processing apparatus such as the information storage apparatus 10 to provide a variety of services.

Also, in the input/output system according to the present embodiment, direct projection from the smartphone 11 may be implemented if the projector 14 is capable of direct projection from the smartphone 11, and projection via the information storage apparatus 10 may be implemented if the projector 14 is not capable of direct projection.

Note that the IP address included in the QR code of the MFP 13 may be an exemplary embodiment of input apparatus information specifying an electronic device corresponding to an input apparatus of the present invention. The IP address included in the QR code of the projector 14 may be an exemplary embodiment of output apparatus information specifying an electronic device corresponding to an output apparatus of the present invention. The IP address of the information storage apparatus 10 may be an exemplary embodiment of cooperative processing apparatus information of the present invention. Also, an acquisition unit of the present invention may include the QR code read unit 38, for example. An input control unit of the present invention may include the information storage apparatus, communication unit 32 and the upload screen display unit 37, for example. Also, an output control unit of the present invention may include the information storage apparatus communication unit 32, the print management unit 33, and the projector management unit 34, for example.

Further, the present invention is not limited to the embodiments described above, but encompasses numerous variations and modifications that may be made without departing from the scope of the present invention.

The present application is based on and claims the benefit of priority of Japanese Patent Application No. 2013-052476 filed on Mar. 14, 2013, and Japanese Patent Application No. 2014-037007 filed on Feb. 27, 2014, the entire contents of which are hereby incorporated herein by reference.

What is claimed is:

1. An input/output system comprising:
a mobile terminal;
a cooperative processing apparatus; and
a plurality of electronic devices;
wherein the mobile terminal includes a first processor coupled to a first memory storing instructions which, when executed, causes the first processor to perform process steps of
acquiring first apparatus information specifying a first electronic device of the plurality of electronic devices from the first electronic device after accepting an instruction to execute an input process;
transmitting an input process execution request to execute the input process to the first electronic device that is specified by the acquired first apparatus information;
acquiring second apparatus information specifying a second electronic device of the plurality of electronic devices from the second electronic device after receiving an instruction to execute an output process with respect to electronic data input to the cooperative processing apparatus by the input process executed by the first electronic device;
directly transmitting a first execution request to execute the output process with respect to the electronic data from the mobile terminal to the second electronic device if the second electronic device and the mobile terminal are capable of direct data communication; and
transmitting a second execution request to execute the output process with respect to the electronic data to the cooperative processing apparatus if the second electronic device and the mobile terminal are not capable of direct data communication; and
wherein the cooperative processing apparatus includes a second processor coupled to a second memory storing instructions which, when executed, causes the second processor to perform process steps of
storing the electronic data input by the first electronic device; and
transmitting a third execution request to execute the output process to the second electronic device upon receiving the second execution request from the mobile terminal, the third execution request including the stored electronic data and causing the second electronic device to output the stored electronic data.

2. The input/output system as claimed in claim 1, wherein if the second electronic device and the mobile terminal are capable of direct data communication, the first processor of the mobile terminal directly transmits to the second electronic device, the first execution request including the electronic data that has been converted into an output format compatible with the second electronic device.

3. The input/output system as claimed in claim 1, wherein if the second electronic device and the mobile terminal are not capable of direct data communication, the first processor of the mobile terminal transmits to the cooperation processing apparatus, the second execution request including the second apparatus information.

4. The input/output system as claimed in claim 3, wherein upon receiving the second execution request from the mobile terminal, the second processor of the cooperation processing apparatus converts the stored electronic data into an output format compatible with the second electronic device based on the second apparatus information, and transmits the third execution request including the converted electronic data to the second electronic device.

5. The input/output system as claimed in claim 1, wherein the first processor of the mobile terminal further performs process steps of
acquiring from the second electronic device, direct communication capability information indicating whether the second electronic device and the mobile terminal are capable of direct data communication; and
determining whether the second electronic device and the mobile terminal are capable of direct data communication based on the acquired direct communication capability information.

6. The input/output system as claimed in claim 1, wherein the first electronic device is an image scanning apparatus that generates image data by scanning a document; and
the second electronic device is at least one of an image forming apparatus that prints out image data and an image display apparatus that displays image data.

7. The input/output system as claimed in claim 1, wherein the mobile terminal includes a camera; and
the first processor acquires the first apparatus information and the second apparatus information from image data captured by the camera.

8. The input/output system as claimed in claim 1, wherein the first processor of the mobile terminal transmits the input process execution request to the cooperative processing apparatus; and
the second processor of the cooperative processing apparatus receives the input process execution request, and transmits the received input process execution request to the first electronic device upon receiving an acquisition request from the first electronic device.

9. An input/output method implemented in an input/output system including a mobile terminal, a cooperative processing apparatus, and a plurality of electronic devices, the input/output method comprising:
causing the mobile terminal to acquire first apparatus information specifying a first electronic device of the plurality of electronic devices from the first electronic device after accepting an instruction to execute an input process;
transmitting an input process execution request to execute the input process from the mobile terminal to the first electronic device that is specified by the acquired first apparatus information;
causing the mobile terminal to acquire second apparatus information specifying a second electronic device of the plurality of electronic devices from the second electronic device after receiving an instruction to execute an output process with respect to electronic data input to the cooperative processing apparatus by the input process executed by the first electronic device;
directly transmitting a first execution request to execute the output process with respect to the electronic data from the mobile terminal to the second electronic device if the second electronic device and the mobile terminal are capable of direct data communication;

transmitting a second execution request to execute the output process with respect to the electronic data from the mobile terminal to the cooperative processing apparatus if the second electronic device and the mobile terminal are not capable of direct data communication;

storing the electronic data input by the first electronic device in the cooperative processing apparatus; and transmitting a third execution request to execute the output process from the cooperative processing apparatus to the second electronic device when the cooperative processing apparatus receives the second execution request from the mobile terminal, the third execution request including the stored electronic data and causing the second electronic device to output the stored electronic data.

10. A mobile terminal comprising:

a memory storing instructions; and a processor coupled to the memory and configured to execute the instructions stored in the memory including process steps of acquiring first apparatus information specifying a first electronic device from the first electronic device after accepting an instruction to execute an input process;

transmitting an input process execution request to execute the input process to the first electronic device that is specified by the acquired first apparatus information;

acquiring second apparatus information specifying a second electronic device from the second electronic device after receiving an instruction to execute an output process with respect to electronic data input to a cooperative processing apparatus by the input process executed by the first electronic device;

directly transmitting a first execution request to execute the output process with respect to the electronic data from the mobile terminal to the second electronic device if the second electronic device and the mobile terminal are capable of direct data communication; and transmitting a second execution request to execute the output process with respect to the electronic data to the cooperative processing apparatus if the second electronic device and the mobile terminal are not capable of direct data communication;

wherein the cooperative processing apparatus stores the electronic data input by the first electronic device, and transmits a third execution request to execute the output process to the second electronic device upon receiving the second execution request from the mobile terminal, the third execution request including the stored electronic data and causing the second electronic device to output the electronic data.

\* \* \* \* \*